Oct. 24, 1961     M. P. GOLDEN     3,005,252
ELECTRODE FORMING AND MOUNTING APPARATUS
Filed Dec. 26, 1957     4 Sheets-Sheet 1
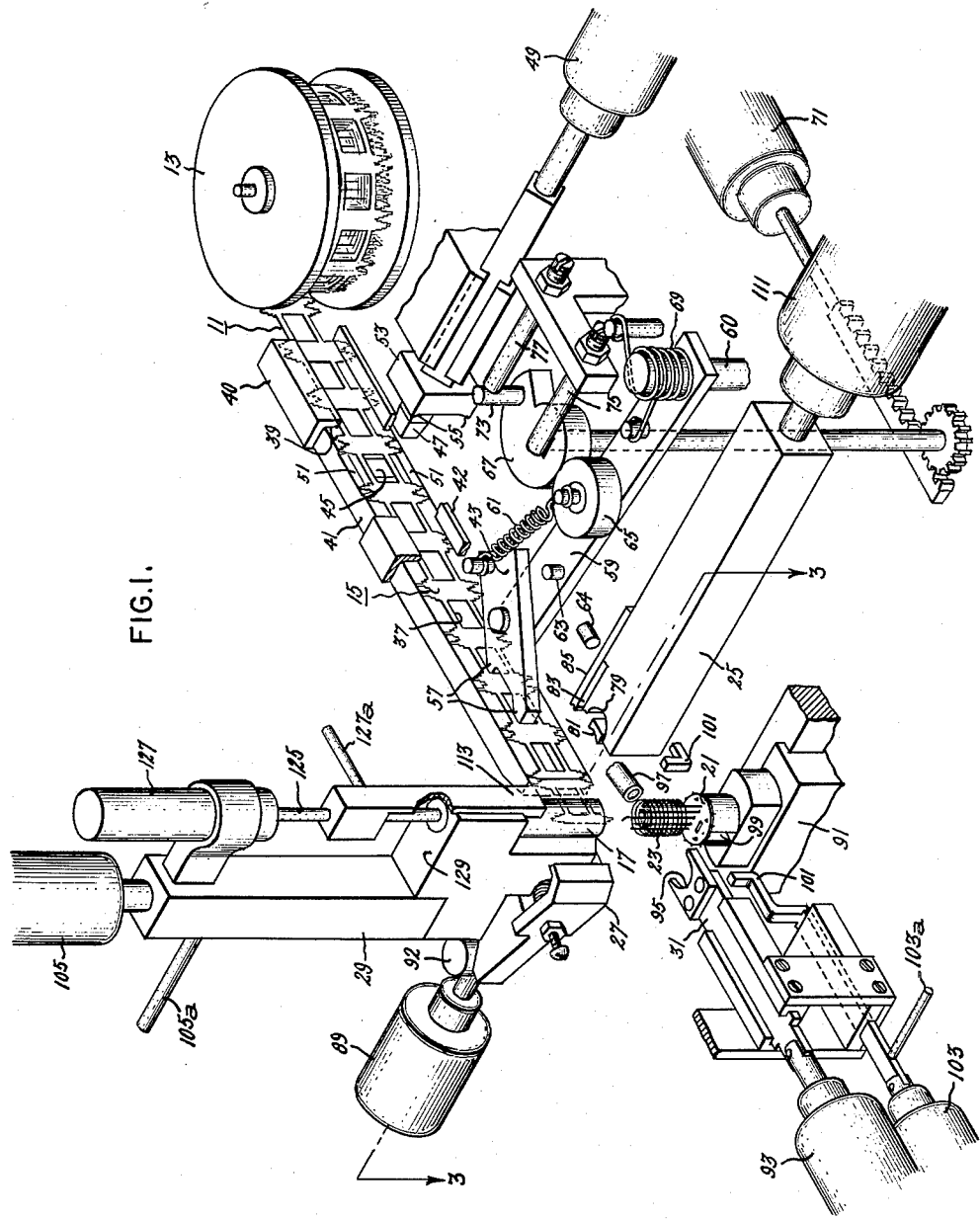
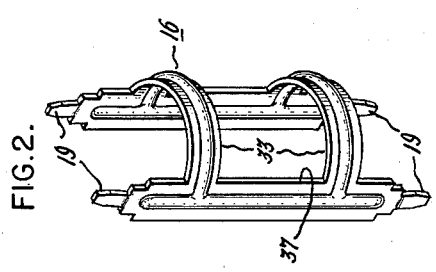
INVENTOR:
MARTIN P. GOLDEN,
BY *Nathan J. Cornfeld*
HIS ATTORNEY.

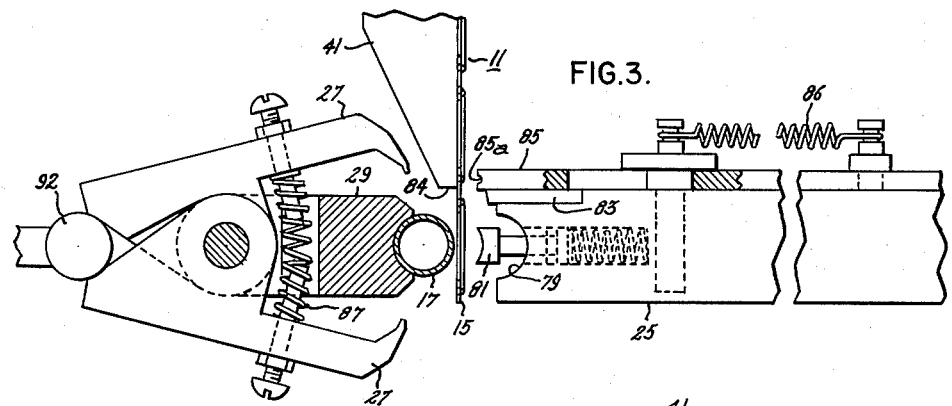
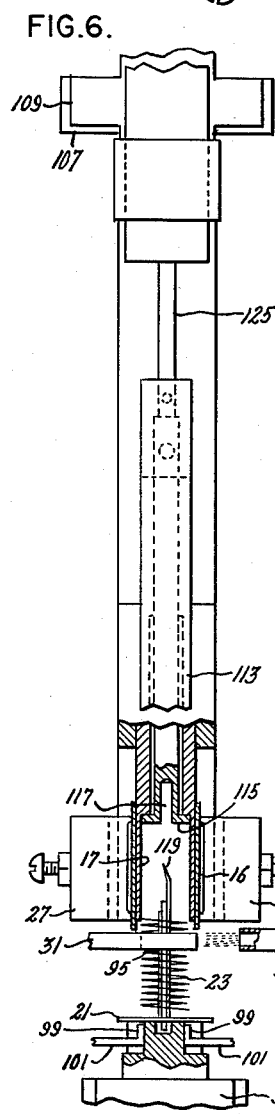
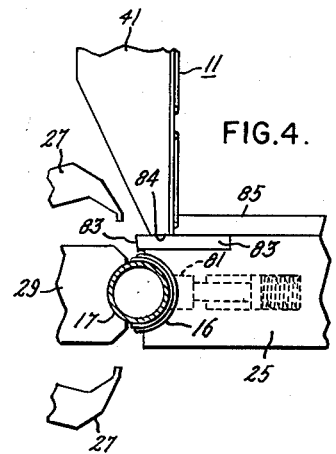
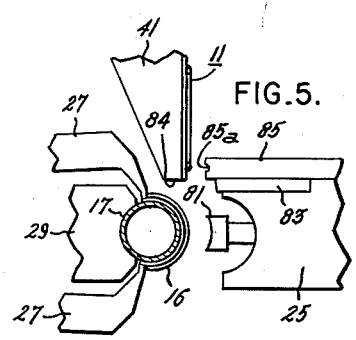
INVENTOR:
MARTIN P. GOLDEN,
BY Nathan ▓▓▓▓
HIS ATTORNEY.

Oct. 24, 1961 M. P. GOLDEN 3,005,252
ELECTRODE FORMING AND MOUNTING APPARATUS
Filed Dec. 26, 1957 4 Sheets-Sheet 3

INVENTOR:
MARTIN P. GOLDEN,
BY Nathan Jomfud
HIS ATTORNEY!

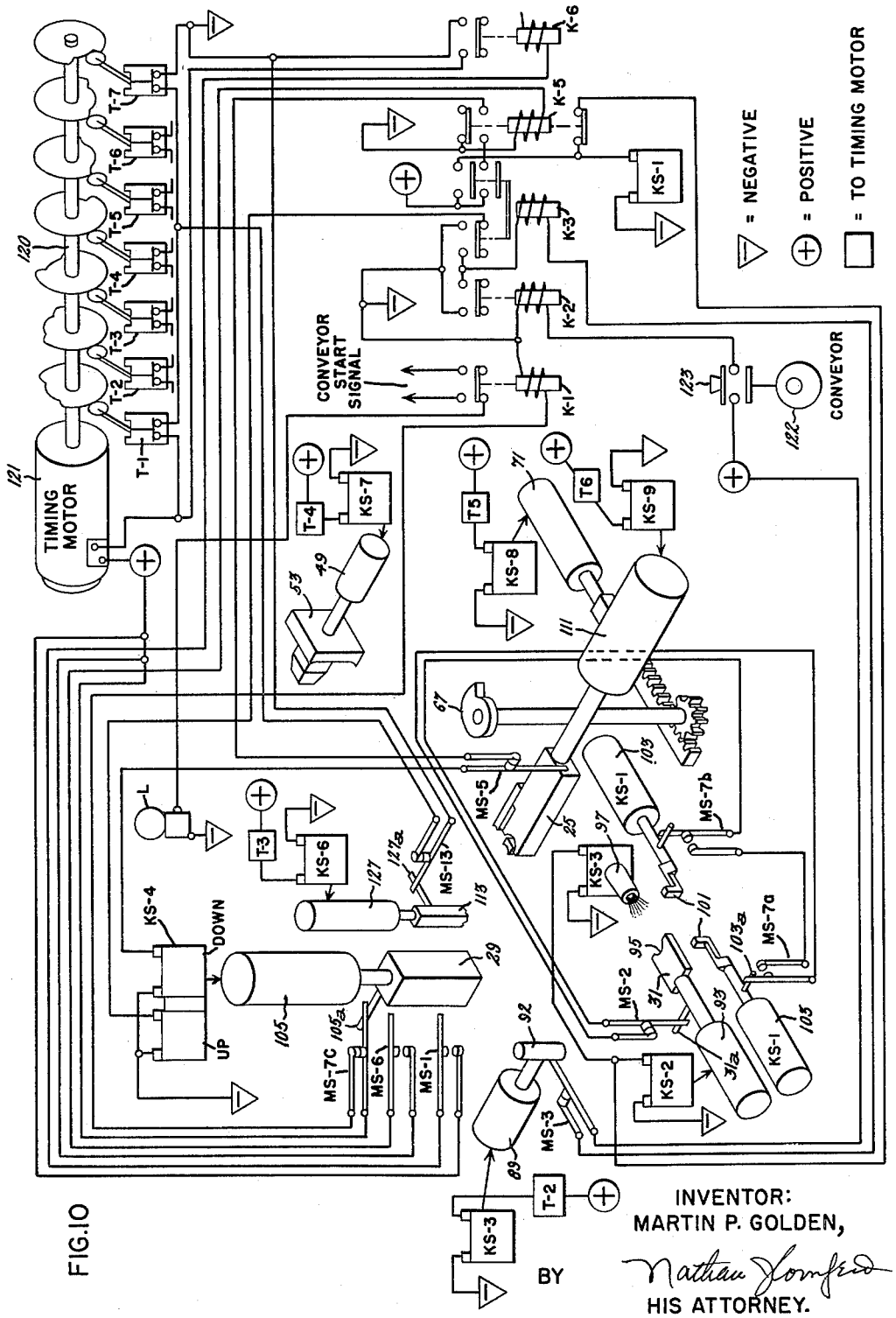

United States Patent Office 3,005,252
Patented Oct. 24, 1961

3,005,252
ELECTRODE FORMING AND MOUNTING APPARATUS
Martin P. Golden, Rexford, N.Y., assignor to General Electric Company, a corporation of New York
Filed Dec. 26, 1957, Ser. No. 705,408
6 Claims. (Cl. 29—25.2)

My invention relates to electric discharge devices and more particularly to new and improved apparatus for forming and mounting electrodes of such electron discharge devices.

In the fabrication of some electric discharge devices, manufacturing techniques include the automatic assembly of electrode mount structures comprising a plurality of electrode elements, some of which elements are small and extremely fragile. In automatic assembly operations, these small and fragile electrode elements are desirably assembled at a relatively fast rate. Additoinally, it is essential that close tolerances be maintained in positioning the electrode elements.

Heretofore, automatic assembly apparatus for electrode elements had been provided which required that each electrode element be individually formed into the desired shape before that apparatus could be operated to assemble the electrode in an electrode mount. The aforementioned multiple operation for forming and mounting electrodes was time-consuming, expensive and resulted in an undesired large amount of handling of each electrode element which tended to damage the element and render it less effective for its intended purpose.

Accordingly, it is a primary object of the present invention to provide new and improved apparatus adapted for forming and mounting electrode elements of an electric discharge device in a single operation.

Further objects and advantages of my invention will become apparent as the following description proceeds and the features of novelty which characterize my invention will be pointed out with particularity in the claims annexed to and forming part of this specification.

In the attainment of the foregoing objects, I provide apparatus for feeding a strip of material, consisting of a plurality of electrode blanks including extending tab members, in step-by-step operation to a forming section including a tubular mandrel. The forming section shears an electrode blank from the strip and forms the electrode to a generally channel-like configuration about the tubular mandrel. The forming section is then actuated to guide the mandrel with the electrode thereon over an array of other electrode elements previously mounted in a support member. With the mandrel thus positioned, the electrode disposed thereabout is mounted in the support member by insertion of the tabs on the end of the electrode into apertures in the support member adapted to receive the tabs. Subsequently, the tabs are bent to secure the electrode to the support member and the mandrel is retracted to the electrode forming position thereof.

For a better understanding of my invention, reference may be had to the accompanying drawings in which:

FIGURE 1 is a fragmentary perspective view of apparatus constructed in accordance with the present invention;

FIGURE 2 is an enlarged perspective view of an electrode element formed in the forming section of the disclosed apparatus and adapted for automatic assembly by the apparatus;

FIGURE 3 is a fragmentary sectional view taken along lines 3—3 of FIGURE 1 and looking in the direction of the arrows;

FIGURE 4 is a fragmentary sectional view along the lines 3—3 of FIGURE 1 showing the elements of the structure in the electrode blank forming and shearing positions;

FIGURE 5 is a sectional view corresponding to FIGURE 4 but showing the elements positioned to hold the electrode blank clamped in position about the mandrel and the shearing member withdrawn from shearing position;

FIGURE 6 is a fragmentary and partially sectionalized view illustrating the initial movement of the mandrel and electrode toward the electrode-assembled position;

FIGURE 10 is a detailed schematic diagram of the control means.

Figure 7:
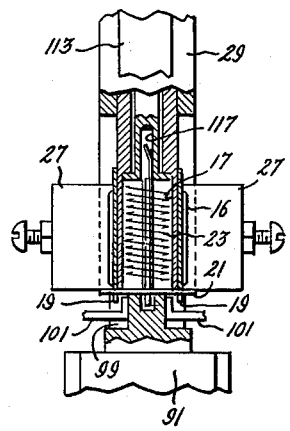
FIGURE 7 is a view similar to FIGURE 6 but showing the mandrel and electrode in the electrode-assembled position.

For purposes of illustration, the present invention has been shown embodied in apparatus for forming and assembling an anode structure of an electric discharge device. However, it is to be understood that my invention is not limited to the assembly of this particular type of structure but is generally applicable to the assembly of other similar elements, such as shields, beam-defining electrodes in beam power tubes and, in fact, any elements which present similar assembly problems as those confronted in the automatic assembly of electrode elements of the type shown in the drawing.

Referring to FIGURE 1, there is shown a strip or ribbon 11 of material being unwound from a containing reel 13. The strip 11 which consists of a connected series of preformed and embossed anode blanks 15 is adapted for being actuated in step-by-step operation for positioning the blanks 15 seriatim at a forming position adjacent a hollow or tubular mandrel 17. While the particular mandrel 17 is tubular, it will be seen that it can for some purposes be less than tubular, for example, semi-cylindrical. It is essential for the present purpose only that it be recessed in the back portion to fit over or around a previously assembled electrode array.

The anode blanks 15 include extending tabs 19 providing a means for securing the anodes to an apertured base member 21 of an electrode array 23. In the forming position each anode blank 15 is sheared from the ribbon 11 and formed around the mandrel 17 by a forming die 25 actuated by an air cylinder 111, thus to assume the configuration of the anode 16 of FIGURE 2. Jaw members 27 clamp the anode around the mandrel 17 following which forming die 25 is withdrawn. A mandrel mount 29, including the jaw members 27 and mandrel 17, is lowered over an array of electrode elements 23 previously mounted on an insulative support member which can be a conventional mica disk 21. The electrode array 23 and the disk 21 are pre-positioned at an anode-assembly station beneath the mandrel 17 by means including a mounting block 91 and an alignment member 31. The tab extensions 19 on anode 16 are inserted in respective apertures in the disk 21 and are bent to secure the anode to the disk. The mandrel mount 29 is then raised or retracted to its original position and the electrode array 23 including the anode 16 may move to another operating station.

The structure and operation of the electrode forming and mounting apparatus will now be described in more detail by referring to FIGURE 1 as well as to the succeeding figures which show some of the structural features and operational sequences in more detail. As clearly seen in FIGURE 1, the ribbon material 11 consists of a series of anode blanks 15 which are preformed by punching and embossing. The anode blanks may be attached in seriatim relation to one another and each comprises a spaced pair of collector portions 32 interconnected by a spaced pair of parallel strips 33 which, together, define an opening 37. Each of the anode blanks 15 includes tabs 19 extending laterally from the edges of the ribbon 11 as extensions of the collector portions 32.

The ribbon material 11 is fed from the reel 13 to and through a guideway 39 comprising L-sectioned blocks 40 secured to the upper side of a main block 41 and elongated members 42 secured in spaced relation to the lower edge of the main block 41. The ribbon 11 is moved in step-by-step operation by a pawl 43 toward the forming position adjacent the mandrel 17. Preferably, the reel 13 is powered by a motor (not shown) which is energized by a micro-switch (also not shown). The micro-switch includes a long blade which senses tightness of the strip material, thus to rouse the motor to unwind the reel until there is a predetermined desired slack provided in the strip.

The guideblock 41 includes a windows 45 for assisting in accurately positioning each anode blank 15 with relation to the mandrel 17. The dimensioning of the blanks 15 and the position of the window 45 relative to the forming position is such that when an opening 37 in an anode blank 15 is in exact register with the window 45, another anode blank 15 is accurately positioned relative to the mandrel 17. To effect the desired registry of the blank openings 37 and guide block window 45, a tapered pin member 47 is adapted for insertion into the window 45 through the opening 37 in the particular anode blank 15 in front of the window 45. If the registry of the opening and window is not exact, the tapered construction of the pin 47 causes the ribbon 11 to move in the guideway 39 an amount required to align exactly the opening 37 with the window 45. The pin member 47 is actuated cyclically by an air cylinder 49. Additionally, the pin member 47 maintains the ribbon 11 in position during the return movement of the pawl 43, the structure and operation of which will be described in detail hereinafter.

The pin member 47 and its actuating air cylinder 49 serve a second purpose of preparing the anode tabs 19 for easier insertion into respective apertures of support members, such as the mica disk 21. To accomplish this preparation of the tabs, the main block 41 is formed on the upper and lower sides of the window 45 with two recessed portions 51 defining an angle of approximately 10° with the vertical. These recessed portions 51 are adapted to accommodate the upper and lower tabs 19 of the anode blank 15 positioned at the window 45. A die-like member 53 having edge portions 55 adapted to be received by the recessed portions 51 is carried by the pin member 47 at a point spaced inwardly from the tapered end thereof. As the pin 47 is inserted into the window 45, the member 53 moves into a position wherein the portions 55 engage and bend the tabs 19 into the recessed portions 51 of the main block. Bending the tabs 19 about 10° facilitates the insertion of the tabs into their respective apertures in disk 21. Additionally, the member 53 straightens any of the tabs 19 or other portions of the strip 11 which may emerge from the reel 13 in a bent or twisted condition, due, for example, to prior handling.

The pawl 43 includes two extending fingers 57, which fingers are adapted to ride in guideway 39. The fingers 57 are spaced such that each finger is insertable in successive openings 37 in the ribbon material 11 to engage adjacent anode blanks 15. The two fingers 57 are adapted to be inserted in the openings of the ribbon 11 and can be moved forward for engaging the ribbon and advancing it a distance equal to the width of a formed anode. After the forward movement, the pawl 43 reverses direction and the finger 57 rides over the ribbon 11 to return to the initial position. It is during this return movement of the pawl that the pin 47 is effective for preventing backward movement of the ribbon.

The pawl 43 is pivoted on one end of a swinging arm 59, which arm is mounted on a fixed pivot 60 at its opposite end to permit rotational movement thereof. The pawl 43 is biased by a spring 61 attached toward the center of the swinging arm 59 such that the fingers 57 of pawl 43 tend to bear against the guideway 39. A stop 63 references the position of fingers 57 such that the ribbon material 11 will be moved a controlled distance during the forward feed strokes of arm 59. A forward position stop 64 for feed arm 59 determines the distance arm 59 swings and thereby determines the feed position of the ribbon. A cam roller 65 is carried on the swinging arm 59 and a cam member 67 cooperates with the roller 65 to move the arm 59, which arm is biased toward the cam 67 by a torsion spring 69. The cam 67 is driven by a gear and rack arrangement wherein the rack is adapted for actuation by an air cylinder 71. Rod member 73 is adapted to hit stops 75 and 77 thereby to limit motion of the cam 67 in either direction. The actuation of the air cylinder 71 is determined by the sequence and timing of an electric control circuit to be described in detail hereinafter. The timing of the control circuit is such that after the air cylinder 71 actuates the pawl to feed the strip 11 into position for shearing and forming, as will hereinafter be described, the air cylinder 71 remains in the actuated position until after the forming die 25 has been withdrawn from the mandrel 17. Thereafter, the air cylinder retracts the rack whereby the pawl 43 is actuated to the initial or "cocked" position of FIGURE 1 until after the anode is completely mounted and the mandrel mount 29 and the stripper members 113 and 125 have returned to a raised position.

When the mandrel mount and strippers are raised, the air cylinder 71 is again actuated and the pawl 43 is actuated to feed strip 11 forward to position the forwardmost anode blank in the shearing and forming position shown in dot and dash lines. During each forward operation of the pawl 43, the ribbon 11 is moved forward toward the mandrel 17 a length sufficient to position an anode blank adjacent the mandrel 17, in the manner illustrated in FIGURE 3.

A forming die 25 which is mounted such as to be slideably movable and having an end portion 79 which conforms to the mandrel 17 is next actuated to force an anode blank 15 against the mandrel 17 in the manner shown in FIGURE 4. The end portion 79 of die 25 includes a locator 81 yieldingly mounted thereon to extend forward of die 25, and a blade member 83 for cooperating with a sharp edge 84 on the end of the block 41 for shearing the anode blanks 15 from the ribbon 11. A snubber 85 is also yieldingly mounted on the die 25 and is effective for bearing against the free end of the ribbon 11 during the shearing and forming operation. The snubber 85 includes in the end thereof a vertical semicylindrical channel which is positioned to fit over the vertical embossment on the forward vertical portion of the next succeeding blank 15, in the manner shown in FIGURE 4. This engagement serves to hold the ribbon 11 in place during the various operations on a blank positioned before the mandrel. The yieldable mounting of the snubber 85 is obtained by the structure illustrated in detail in FIGURE 3 wherein it is seen that the snubber is biased by spring 86 to return the snubber to a position slightly forward of blade 83.

The locator 81 initially contacts the anode blank 15 positioned before the mandrel 17 to hold the blank in position for the shearing and forming operations. The blank 15 is sheared by blade 83 from the ribbon 11 along a line extending between adjacent blanks 15. The end portion 79 of the forming die 25 next contacts the flat anode blank 15 which has been sheared from the ribbon 11 and bends it to conform with the mandrel 17, thus to assume the configuration of the anode element 15 of FIGURE 2.

Referring to FIGURES 1 and 3, two intermediately pivoted grip jaws 27, which are biased to an open position by springs 87, are adapted for being actuated to close by an air cylinder 89. The air cylinder when actuated forces a cam 92 carried on the piston rod thereof against the afterpart or cam surfaces of the jaws 27 to bring the forward or gripping parts of the jaws into contact with the partially-formed anode 16 in the manner shown in FIGURE 5. Thus, jaws 27 securely grip the ends of the anode 16 and complete the forming action on the mandrel 17. The forming die 25 is thereafter withdrawn.

Referring again to FIGURE 1, the array of electrode elements 23 is affixed to a mica disk 21. The disk 21 is suitably mounted on a mounting block 91 of a conveyor belt system or the like, not shown, to index the electrode elements 23 in predetermined position beneath the mandrel 17. Alternatively, any suitable means can be employed for accurately positioning the previously assembled electrode array 23 beneath the mandrel 17.

The electrode array 23 is aligned in a vertical position by the grid aligner or orienter 31 actuated by, for example, an air cylinder 93. The grid aligner 31 includes an end portion 95 which has been recessed to accommodate the periphery of the outermost electrode of the array 23. Referring now to FIGURE 6 as well as to FIGURE 1, the grid aligner 31 is actuated a predetermined distance toward the electrode array 23 and the array 23 is then moved into engagement with the end portion 95 of aligner 31 by means of a stream of air from a nozzle 97. The nozzle 97 is connected to a compressed air source (not shown) and is controlled by a magnetic solenoid controlled air valve in a manner to be described hereinafter. Thus, the array is held in engagement with the end portion 95 of the grid aligner and the array is vertically accurately positioned relative to the mandrel. The grid aligner 31 remains in the just-described aligning position and the air stream from the nozzle 97 is continued until a portion of the hollow mandrel 17 is actuated downwardly and started over the upper end of the electrode array 23. Thereafter, and before the mandrel continues downwardly, the aligner 31 is retracted.

Mounting block 91 has, as seen in FIGURES 1 and 6, diametrically disposed lateral apertures 99 adapted to receive tab benders 101 on opposite sides of the mount. The tab benders are L-shaped members and are actuated by a pair of air cylinders 103, only one of which is shown in FIGURE 1, into the apertures 99 at the time the grid aligner 31 is moved toward the array 23. The operation of the tab benders will be more fully described hereinafter.

The mandrel 17 is adapted for being lowered in two steps to envelop or fit over the electrode array 23. First, the mandrel mount 29 is lowered by being actuated as by an air cylinder 105 shown in FIGURE 1 until the mandrel 17 and the anode 16 held against the mandrel 17 by jaws 27 are fitted over the upper portion of the electrode array 23, as in FIGURE 6. Then the downward movement of the mount is arrested with the mandrel in the position of FIGURE 6. Next, the grid aligner 31 is retracted and the mount 29 continues downward. This operation is controlled by circuitry including a timing motor and a magnetic solenoid controlled air valve to be described hereinafter.

Referring now to FIGURE 7, continued downward movement of the mount 29 causes the mandrel 17 and the anode 16 to be completely fitted over the electrode array 23, and the tab extensions 19 on the anode 16 to be forced through the respective apertures in the mica disk 21. The tab benders 101 which had been previously inserted in the apertures 99 of mounting block 91 are next retracted or actuated outwardly by the air cylinders 103, thereby to engage and bend outwardly the tabs 19 which have been inserted through the apertures of the base member 21.

Figure 8:
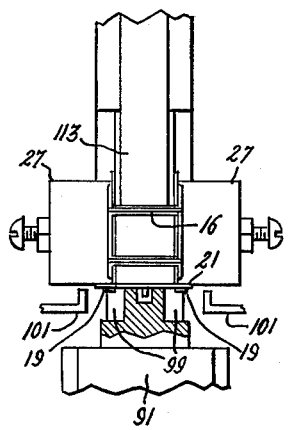
FIGURE 8 is a fragmentary view which in conjunction with FIGURE 7 is illustrative of the means for bending the electrode tabs to affix the electrode to the support member.

The tabs 19 are bent outwardly and flat in the manner shown in FIGURE 8 thereby to secure the anode 16 to the disk 21 and to include the anode in the electrode array 23.

Next, the grip jaws 27 are actuated to open, and the mandrel 17 is raised or retracted from the assembled anode 16. Due to the close fit between the anode 16 and the mandrel 17, there is a slight tendency for the anode to move upward with the mandrel as the mandrel is retracted and thus be pulled out of the disk 21. To remedy this, an anode stripper 113 is employed with the mandrel 17 to engage the upper parallel strip 33 of the anode 16 to separate the anode from the mandrel in the manner shown in FIGURE 9. An electrode hold-down member 115 is included within mandrel 17 and includes a recess 117 for accommodating the relatively longer cathode tab 119 of array 23. Member 115 includes a flange 121 which bears against the upper ends of electrode support rods 123 to prevent any of the rods from being jarred or otherwise moved upward.

Figure 9:
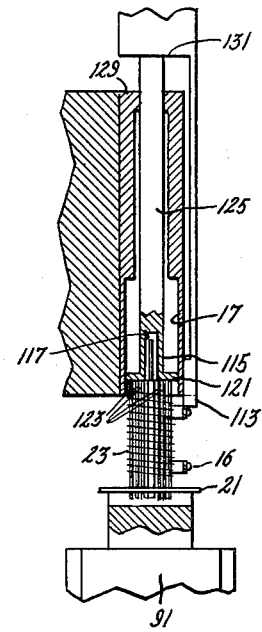
FIGURE 9 is a fragmentary sectional view showing the forming section being retracted from the electrode-assembled position.

Referring to FIGURE 1 as well as FIGURE 9, the mandrel stripper 113 and electrode hold-down member 115 are both affixed to a vertical rod 125 which extends through the interior of mandrel 17. As the mandrel is raised or retracted, the rod 125 is actuated in a downward position by an air cylinder 127. The rod 125 is actuated downward as the mandrel 17 is raised, resulting in the mandrel stripper 113 and electrode hold-down member 115 maintaining a net stationary effect. The anode 16 and the cathode tab 119 and support rods 123 thus tend to remain in predetermined stationary position while the mandrel 17 is retracted.

After the mandrel 17 is removed, a shoulder 129 on mandrel mount 29 engages the underside of the casing of the mandrel stripper 113 and retracts the entire mandrel mount from the assembled anode 16. In the upward movement of the stripper 113, a stud 127a actuates a micro-switch which controls a timing motor in the control circuit.

*Operational sequence*

The desired operation of the above-described apparatus is effected by the control circuitry illustrated in FIGURE 10. In such operation the anode mount 29 with a formed anode carried on the mandrel 17 and actuated by the air cylinder 105 starts downward. Then the grid aligner or orienter 31 is advanced by the air cylinder 93 to the position thereof in FIGURE 6. An air stream emanating from the nozzle 97 maintains the outermost grid of the array 23 in aligning position against the accurately disposed surface 95 of the aligner 31. Thereafter the tab benders 101 are actuated by the air cylinder 103 to the advanced position of FIGURE 7. Following this, the downward movement of the mount 29 is arrested in the position thereof in FIGURE 6 wherein the hollow mandrel has started to receive the upper ends of the grid side rods. Then the aligner 31 is retracted and the air stream discontinued, following which the mount 29 resumes its downward stroke, for positioning the mandrel 17 over the grid array 23 bottoms, to position the tabs 19 of the anode carried on the mandrel in the aperture of the mica 21, and pauses. The tab benders 101 are then retracted to the positions of FIGURE 8, whereby the tabs 19 are bent outwardly under the mica for securing the anode to the mica.

Subsequently, the stripper 113, actuated by the air cylinder 127, moves down to the position thereof in FIGURE 9 and pauses, following which the clamping jaws 27 are opened by actuation of the air cylinder 89. Then the mount 29 moves upwardly, returning the stripper 113 to its retracted position.

Following the just-described operation, the strip aligner and straightener comprising parts 47, 53 and 55, which had previously been actuated to an operating position by the air cylinders 49, is retracted. Then the strip feed pawl 43 is advanced through the actuation of the air cylinder 71 for causing the jaws 57 thereon to engage the strip and advance same to position an anode blank at the operating station. Then the pawl 43 pauses for a short period during which the cylinder 49 is actuated for moving the strip straightener into operative position, following which the pawl 43 is retracted or returned to its "cocked" position in preparation for a subsequent strip-advancing actuation.

Following the positioning of an anode blank at the operating station, the die 25 carrying the forming and shearing elements is advanced by the air cylinder 111. The element 85 carried by the die 25 clamps the strip in cutting position while the shearing element 83 effectively shears the end anode blank from the strip 11. Additionally, the anode blank is formed about the mandrel 17 by operation of the element 81 and the forming surface at the end of the die 25. After thus forming the severed anode blank, the die 25 pauses while the jaws 27 are closed by actuation of the cylinder 89, thus to clamp the formed anode to the mandrel 17. Then the die block 25 is retracted and the anode positioning operation commences in the manner described above at the outset of this description of operational sequence.

*Control circuit operation*

In the control circuit illustrated in FIGURE 10, designation S indicates a toggle switch on a control box cover. KS indicates a magnetic solenoid controlled air valve of any suitable type. K indicates a solenoid-operated electrical switch. T indicates a timer cam and its associated micro-switch. MS indicates a micro-switch operated by the motion of the machine part which it contacts. The timing cams T are all carried on the shaft 120 of a suitable timing motor 121.

The circuit receives a start pulse from a conveyor which is not shown but is indicated at 122 in FIGURE 10. The conveyor is effective for positioning the mount block 91 at the operating station. Alternatively, a manual switch 123 may be closed to provide the start pulse.

The start pulse momentarily energizes relay K-2 thus to close a pair of normally open K-2 contacts for thereby energizing relay K-3. A pair of normally open K-3 contacts thus are closed for locking closed the energizing circuit of K-3 which is completed by the closing of microswitch MS-3 by actuation of the jaws 27, the jaws 27 having been actuated by the air cylinders 89, through energization of the magnetic solenoid controlled air valve KS-5 which, in turn, has been actuated by closing of T-2 under the influence of its associated timing motor driven cam on the shaft 120. Another pair of normally open K-3 contacts are closed by energization of K-3, whereby KS-1 is energized for (1) actuating the air cylinders 10 to move the tab benders 101 to the position of FIGURE 7; (2) energizing KS-2 which actuates the air cylinder 93 to advance the grid aligner 31 to aligning position; and (3) energizes KS-3 which commences the flow of an air stream from nozzle 97 for holding the outermost grid against the aligner.

Still another pair of normally open K-3 contacts are closed when K-3 is energized for thereby energizing one or the "down" coil of the solenoids air valve KS-4 which is operated to determine the movement of the mount 29. This energization of KS-4 actuates the air cylinder 105 to drive the mount 29 downward, provided MS-5 is actuated closed by the die 25 being in its retracted position.

During the downward movement of the mount 29, an arm 105a thereon engages and actuates closed a one-way microswitch MS-6 which completes an energizing circuit through relay K-5 whereby a normally open pair of K-5 contacts are closed for completing a relay locking circuit through K-5. A pair of normally closed K-5 contacts open, whereby the aforementioned one coil of KS-4 is de-energized for causing the above-described arrestation of the downward movement of the mount 29 in the position of FIGURE 6. Additionally, another pair of normally closed K-5 contacts are opened, which de-energizes KS-2 and KS-3, and thereby causes retraction of the grid aligner 31 and closes the nozzle 97. When the grid aligner 31 is fully retracted, an arm 31a thereon actuates MS-2, energizing the aforementioned one coil of KS-4 again for continuing the previously arrested downward movement of the mount 29.

When the mount 29 has bottomed or reached its lowest position, the arm 105a thereon actuates MS-1 for energizing relay K-6. Thus, normally open K-6 pair of contacts are closed, starting the timing motor 121 since a timer switch T-7 is being actuated by its associated cam on the time motor cam shaft 120. The timer switches T-2 and T-3 control the time operation of the jaws 27 and stripper 113 and operate same at the proper predetermined time in the operating cycle. Specifically, T-2 is closed and thus energizes KS-5 when the formed anode is to be held clamped to the mandrel; and T-3 is closed for energizing KS-6 when the stripper 113 is to engage and hold down the elements until the mandrel is raised. The timer motor makes a small part of a revolution and stops when the timer switch T-7 opens.

A normally closed pair of K-6 contacts open when K-6 is energized whereby the air cylinders 103 are caused to retract the tab benders for bending the anode tabs beneath the mica. When the tab benders are thus actuated, arms 103a thereon engage and open micro-switches MS-7a and MS-7b, whereby the mentioned one coil of KS-4 is de-energized.

When the jaws 27 open, MS-3 is no longer actuated, whereby relay K-3 is de-energized. Thus, a normally closed pair of K-3 contacts close for energizing the second or "up" coil of the solenoid KS-4 which causes the air cylinder 105 to retract or raise the mount 29. When moving to its upper position, the mount 29 engages and raises the stripper whereby an arm 127a thereon actuates MS-13 for again energizing and causing rotation of the timing motor 121. The motor then completes one revolution and stops when the timer switch T-1 opens. Timer switches T-4, T-5 and T-6 control the movement of the die 25, straightener 53 and pawl 43, respectively, in the sequences of operation above described.

Relay K-1 is energized when both the tab benders 101 and the mount 29 are retracted. A normally open pair of K-1 contacts are included in the conveyor interlock circuit and, when closed, completes the circuit to allow the conveyor to index. A normally closed pair of K-1 contacts complete the circuit to an external light L which, if K-1 is not energized, lights to indicate that the apparatus is holding up the conveyor. This feature is particularly useful where the presently disclosed apparatus constitutes one of a plurality associated with a single conveyor.

It will be understood that while my invention is illustrated in equipment for forming and mounting anodes, it is possible to utilize my invention in forming and mounting any elements the forming and mounting of which involves problems similar to those encountered in forming and mounting electrode elements.

While specific examples have been given describing details of this invention, it will be understood that such examples have been given merely by way of illustration and that the invention is to be construed as including other modifications within the true spirit and scope of the appended claims.

What I claim as new and desire to secure by Letters Patent of the United States is:

1. Apparatus for forming and mounting elements in base members carrying previously mounted upstanding concentric arrays of elements comprising, a forming and assembling station, means for holding one of said base members at said station, a recessed mandrel at said station movable vertically between a forming position and a delivery position, means reciprocable with said mandrel for conforming and holding to said mandrel another element to be mounted in said base member in spaced relation to said array of elements, support means for aligning at least the other element of said concentric array of elements relative to the recess in said mandrel, and means for moving said mandrel to said delivery position with said other element thereon to fit said recessed mandrel over said array of elements and mount said other elements in said base member in spaced relation to said array and locking means operative responsive to said mandrel movement to said delivery position to secure the mandrel-carried element to said base member, and a reciprocable hold-down member within said mandrel engageable with said array during at least the first portion of the withdrawal of said mandrel from delivery position.

2. Apparatus for forming and mounting an anode in a base member in spaced relation about a previously mounted upstanding concentric array of grids comprising, a forming and assembling station, means for holding said base member beneath said station, a reciprocable hollow mandrel at said station, means for conforming and holding to said mandrel an anode blank, grid array supporting means positionable relative to said mandrel and engageable with said array of elements thereby accurately to position said array relative to said mandrel, and means for directing a stream of air against said array of elements thereby to hold said array in aligning engagement with said supporting means, means for moving said grid array supporting means into an operative position in the path of said mandrel, means for actuating said mandrel a limited amount to start said mandrel and anode over the end of said array, and means for retracting said grid array supporting means from said operative position and continuing the actuation of said mandrel to fit said mandrel and anode completely over said array and mount said anode in said base member.

3. Apparatus for forming elements and mounting said elements in base members by inserting end portions of said elements through said base members comprising, a forming and assembling station, means for holding one of said base members at said station, element forming means at said station including a hollow movable mandrel, means for conforming and holding said element to said forming means, means for actuating said mandrel with said element thereon to insert said end portions of said element in said base member at said station, and means transversely movable beneath said base member for engaging and bending the inserted end portions of said element thereby to secure said element to said base member.

4. Apparatus for forming and mounting elements in surrounding relation with other previously mounted cooperative elements in base members comprising, a forming and assembling station, means for holding a base member at said station, means including a guide block for feeding a plurality of elements connected in ribbon form seriatim to said station, a vertically reciprocable hollow mandrel at said station, a horizontally reciprocable die member operative for severing an element at said station from the remainder of said elements and forming said severed element about said mandrel, a member yieldably mounted on said die member and engageable with the element next to be fed to said station prior to and during the severing of said element at said station for maintaining said remaining elements in fixed position against said die block during severance of said element, means reciprocable with said mandrel for holding the formed element to said mandrel, means for moving said mandrel into a delivery position in surrounding relation with said other cooperative elements with the formed element on said mandrel to mount said element in said base member at said station, means operable responsive to movement of said mandrel into said delivery position for locking said element in mounted relation with said base member, and means operable responsive to withdrawal of said mandrel for stripping said element from said mandrel, and hold-down means reciprocable within said mandrel and supportingly engageable with said other cooperating elements during mounting of said formed element in said base member.

5. Apparatus for forming and mounting elements in base members comprising, a forming and assembling station, means for holding a base member at said station, a guide block adapted for having a plurality of apertured elements connected in ribbon form fed therepast to said station, said guide block having a window in one portion, feeding means adapted for feeding elements seriatim to said station and indexing said elements to said window in said guide block, a reciprocable member having tapered side walls engageable with the edges of an aperture in said elements operative cyclically for moving through the aperture of each element positioned at said window and into said window for locating the element fed to said station accurately at said station, means for severing said element fed to said station from the remainder of said elements, element forming means at said station movable between a forming position and a loading position, means movable with said element forming means for conforming and holding said severed element to said forming means, and means for actuating said forming means with said element thereon to said loading position to mount said element in said base member at said station.

6. Apparatus for forming and mounting elements in base members comprising, a forming and assembling station, means for holding a base member at said station, a guide block adapted for having fed therepast to said station a plurality of elements which are connected in ribbon form and have each an aperture therein, cyclically reciprocating means including a pivoted feed pawl operative for engaging each element through the aperture therein for advancing said element and returning with a sliding movement over the surface of the next succeeding element in preparation for advancing same, a hollow mandrel at said station vertically reciprocable between a forming position and a loading position, a horizontally reciprocable die member operative for severing an element fed to said station from the remainder of said elements and forming said element about said mandrel, a member yieldably mounted on said die member and engageable with the element next to be fed to said station prior to and during the severing of said element at said station for maintaining said remaining element in fixed position against said guide block during severance of said element, means reciprocable with said mandrel for holding the formed element on said mandrel, means for actuating said mandrel to said delivery position with said element thereon to mount said element in said base member at said station, a stripper associated with said mandrel and engageable with the upper end of the formed element in said delivery position, and means for maintaining said stripper stationary relative to said base during withdrawal of said mandrel toward said forming position.

References Cited in the file of this patent
UNITED STATES PATENTS 2,840,886    Grube et al. _____ July 1, 1958